G. F. BRASSLER.
LOCKING DEVICE.
APPLICATION FILED JAN. 30, 1917.

1,241,914.

Patented Oct. 2, 1917.
2 SHEETS—SHEET 1.

WITNESSES
Frederick Diehl.
Theog. Hoster

INVENTOR
George F. Brassler
BY
ATTORNEYS

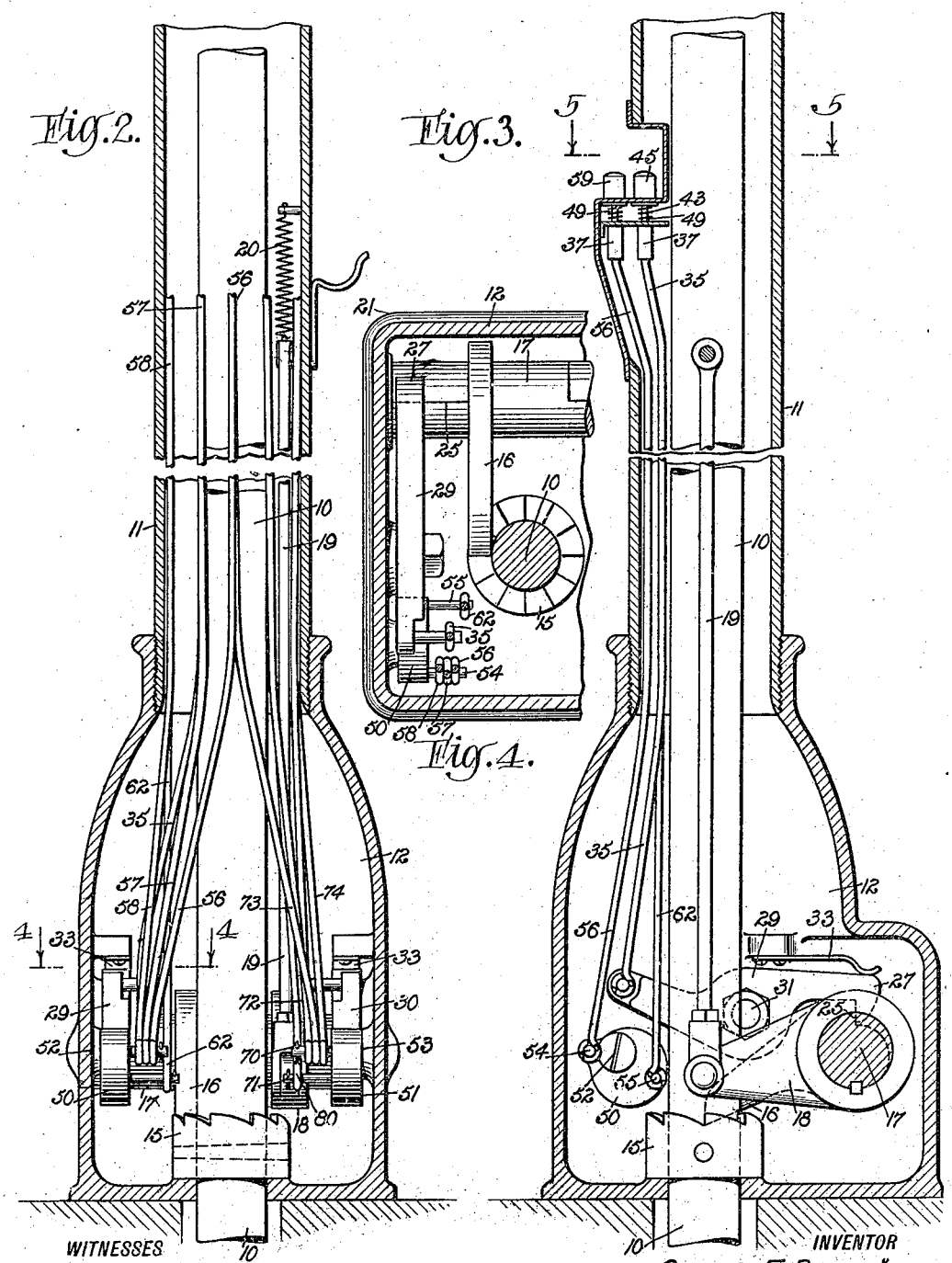

UNITED STATES PATENT OFFICE.

GEORGE FRANCIS BRASSLER, OF NEW YORK, N. Y., ASSIGNOR OF ONE-HALF TO PAUL WALTER, OF WHITESTONE, NEW YORK.

LOCKING DEVICE.

1,241,914.     Specification of Letters Patent.      Patented Oct. 2, 1917.

Application filed January 30, 1917. Serial No. 145,405.

*To all whom it may concern:*

Be it known that I, GEORGE F. BRASSLER, a citizen of the United States, and a resident of the city of New York, Whitestone, borough of Queens, in the county of Queens and State of New York, have invented a new and Improved Locking Device, of which the following is a full, clear, and exact description.

The object of the invention is to provide a new and improved locking device more especially designed for automobiles and other vehicles, and arranged to enable the driver of the vehicle to lock the steering mechanism to prevent an unauthorized person from running away with the machine.

In order to accomplish the desired result, use is made of a manually controlled locking device connected with the steering shaft or other part to be held against turning, a second manually controlled locking device for locking and unlocking said first-named locking device, and a manually controlled blocking device for blocking and releasing the said second locking device.

A practical embodiment of the invention is represented in the accompanying drawings forming a part of this specification, in which similar characters of reference indicate corresponding parts in all the views.

Fig. 2 is an enlarged cross section of the same;

Fig. 3 is a sectional side elevation of the same;

Fig. 4 is a sectional plan view of the same on the line 4—4 of Fig. 2;

Figure 1:
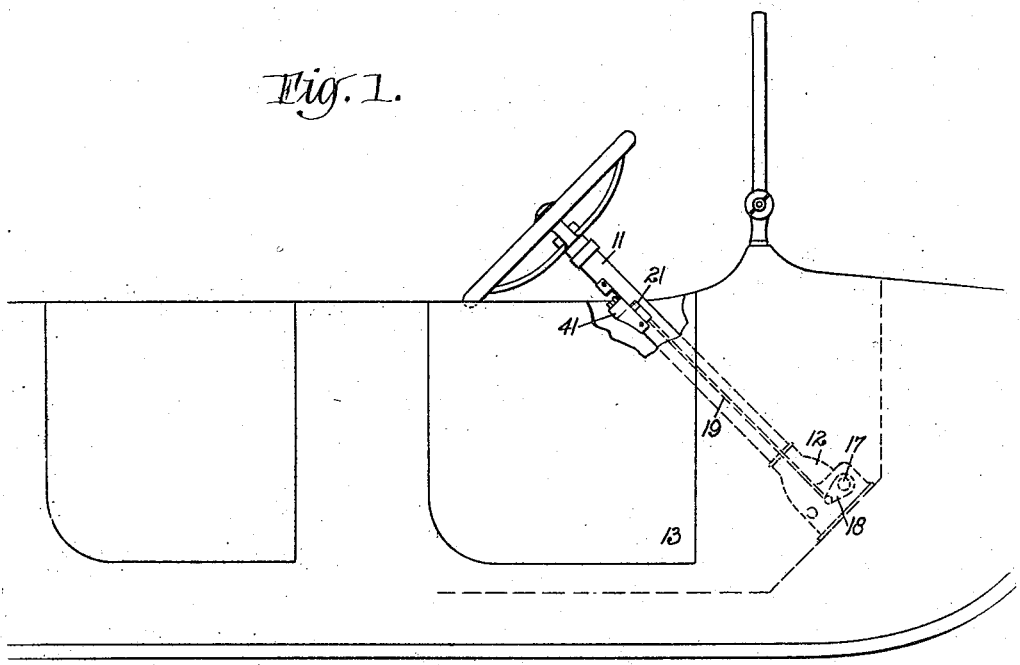
Figure 1 is a side elevation of the locking device as applied to the steering shaft of an automobile.
Figure 6:
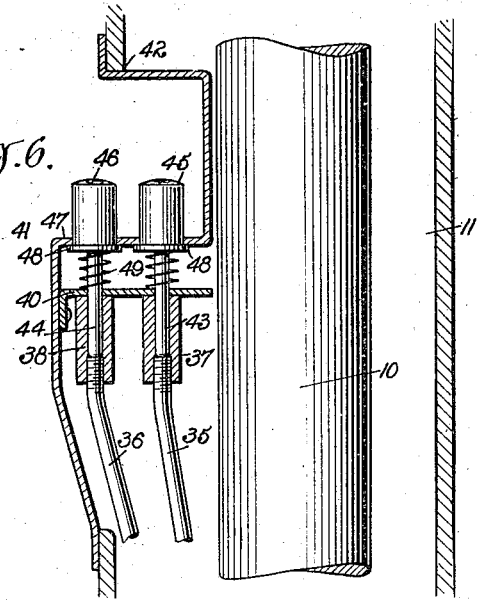
Fig. 6 is an enlarged sectional side elevation of the keyboard mechanism of the locking device, the section being on the line 6—6 of Fig. 5.
Figure 7:
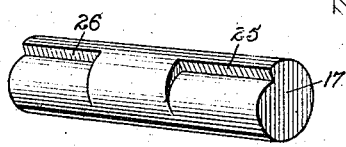
Fig. 7 is a sectional perspective view of the locking shaft.

The locking device is shown applied to a steering shaft 10 extending through a housing or a post 11 having a base 12 attached to the body 13 of an automobile or other vehicle on which the locking device is to be used. On the steering shaft 10 is secured a ratchet wheel 15 adapted to be engaged by a dog 16 secured on a shaft 17 journaled in suitable bearings arranged in the base 12 of the housing 11. On the shaft 17 is secured an arm 18 (see Figs. 1 and 3) pivotally connected with a rod 19 extending within the housing 11 and connected at its upper end with one end of a spring 20 attached to the inside of the housing 11, as plainly illustrated in Fig. 2. A fingerpiece 21 is also secured to the upper end of the rod 19 and it extends to the outside of the housing 11 to be within convenient reach of the driver of the automobile for pushing the rod 19 downward to engage the dog 16 with the ratchet 15 to lock the steering shaft 10 against turning, as hereinafter more fully explained. By the action of the spring 20 the dog 16 is normally held out of engagement with the ratchet wheel 15 to allow of turning the steering shaft 10 for steering the vehicle in the usual manner. The shaft 17 is provided with lengthwise extending alined shoulders 25, 26, adapted to be engaged by hook ends 27 of locking levers 29 and 30 fulcrumed at 31 on the sides of the base 12 of the housing 11. The levers 29 and 30 are pressed on by springs 33 attached to the base 12 to hold the hook ends 27 in engagement with the peripheral face of the shaft 17 and to cause the hook ends 27 to readily snap in behind the shoulders 25 and 26 whenever the shaft 17 is turned into locking position, that is, when the dog 16 is swung downward into engagement with the ratchet wheel 15. The free ends of the levers 29 and 30 are pivotally connected with rods 35 and 36, extending upwardly within the housing 11 and terminating at their upper ends in sleeves 37, 38 adapted to abut against the under side of the plate forming part of a keyboard 41 arranged in a cut-out portion 42 formed in the housing 11. The sleeves 37 and 38 are engaged by the lower ends of pins 43, 44 provided at their upper ends with buttons 45, 46 mounted to slide in the top 47 of the keyboard 41. The lower ends of the buttons 45 and 46 are provided with annular shoulders 48 abutting against the under side of the top 47, and the said flanges 48 are pressed on by springs 49 to normally hold the buttons 45 and 46 in uppermost position, as plainly indicated in Fig. 6. When the buttons 45 and 46 are presesd by the driver then a swinging motion is given to the levers 29 and 30 to disengage the hook ends 27 from the shoulders 25 and 26 to unlock the shaft 17 and to permit of turning the shaft by the action of the spring 20 with a view to disengage the dog 16 from the ratchet wheel 15.

Figure 5:
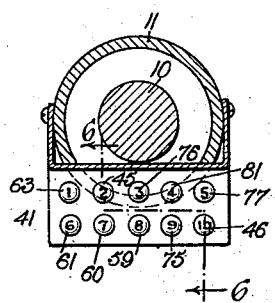
Fig. 5 is a similar view of the same on the line 5—5 of Fig. 3.

In order to block the movement of the levers 29 and 30 use is made of blocking members 50 and 51, preferably in the form of eccentrics pivoted at 52 and 53 on the base 12 of the housing 11. The blocking member 50 is provided at opposite sides of its center with pins 54, 55, of which the pin 54 is connected with the lower ends of three rods 56, 57 and 58 extending upwardly within the housing 11 and connected at their upper ends with spring-pressed buttons 59, 60 and 61 in a manner similar to the connection of the rods 37 and 38 with their buttons 45 and 46. The other pin 55 is connected by a rod 62 with a spring-pressed button 63 arranged on the keyboard 41 and similar to the other buttons. The other blocking member 51 is provided with two pins 70 and 71, of which the pin 70 is connected with the lower ends of three rods 72, 73 and 74 connected at their upper ends with spring-pressed buttons 75, 76 and 77 arranged on the keyboard 41 and similar to the buttons 45 and 46 previously mentioned. A rod 80 is connected with the pin 71 and connects with a spring-pressed button 81 arranged on the keyboard 41 and similar to the buttons 45 and 46. It will be noticed that by the arrangement described ten buttons are mounted on the keyboard 41 and the buttons are preferably provided with indicating characters such as consecutive numerals from 1 to 10, as shown in Fig. 5.

The operation is as follows:

Normally the dog 16 is in raised position, that is, out of engagement with the ratchet wheel 15, and the hook ends 27 of the locking levers 29 and 30 are out of engagement with the shoulders 25 and 26, and the blocking members 50 and 51 are out of blocking position relative to the said levers 29 and 30. The steering shaft 10 can readily be turned by the driver in order to steer the vehicle in the desired direction. When it is desired to lock the steering shaft 10 against turning by unauthorized persons then the driver pushes the fingerpiece 21 downward to turn the shaft 17 with a view to engage the dog 16 with the ratchet wheel 15 and move the shoulders 25 and 26 in register with the hook ends 27 of the locking levers 29 and 30. As these levers are spring-pressed the hook ends 27 readily snap into engagement with the shoulders 25 and 26. The shaft 17 is now locked against turning and likewise the steering shaft 10 owing to the dog 16 engaging the ratchet wheel 15. The driver of the automobile presses any one of the set of buttons 59, 60 and 61, and one of the buttons 75, 76 or 77 to turn the blocking members 50 and 51 to move the latter into blocking engagement with the levers 29 and 30 so that an unauthorized person on pressing the buttons 45 and 46 cannot swing the levers 29 and 30 out of locking engagement with the shoulders 25 and 26 of the shaft 17. From the foregoing it will be seen that in order to unlock the shaft 17 it will be necessary first to reset the blocking members 50 and 51, that is, move the same in non-blocking position relative to the levers 29 and 30, and in order to do so it is necessary to press the buttons 63 and 81 with a view to return the blocking members to the non-blocking position. Next it is necessary to press the buttons 45 and 46 simultaneously to swing the levers 29 and 30 out of locking engagement with the shoulders 25 and 26 of the shaft 17 and then the shaft is turned by the action of the spring 20 connected with the rod 19 to move the dog 16 out of engagement with the ratchet wheel 15. As a large number of buttons (10) are provided it will be impossible for an unauthorized person to press the proper buttons in the proper sequence in order to unlock the shaft 17.

It will be noticed that the sliding connection between the several rods 56, 57, 58 and 62, 72, 73, 74 and 80 with their corresponding buttons 59, 60, 61, 63, 75, 76, 77 and 81 permits movement of the rods up or down whenever the blocking member 50 or 51 is turned by one of its rods. In a like manner the sliding connection between the rods 35 and 36 and their buttons 45 and 46 permits the hook ends 27 of the levers 29 and 30 to ride on the peripheral surface of the shaft 17 without disturbing the uppermost positions of the buttons 45 and 46. Thus the buttons after being pressed and released return to uppermost position irrespective of the position of the rods with which they are slidingly connected.

Although I have shown and described the locking device applied to the steering shaft of an automobile or similar vehicle, it is evident that the locking device may be applied to other parts to be locked, it being understood that the ratchet wheel 15 is attached to the part to be locked.

Having thus described my invention, I claim as new and desire to secure by Letters Patent:—

1. A locking device, comprising a manually controlled locking device connected with the part to be held against turning, a second manually controlled locking device for locking and unlocking the said first-named locking device, and a manually controlled blocking device for blocking and releasing the said second locking device.

2. A locking device, comprising a manually controlled locking device connected with the part to be held against turning, a second manually controlled locking device for locking and unlocking the said first-named locking device, and a manually controlled blocking device for blocking and releasing the said second locking device, the said second locking device and the said blocking device having a keyboard in common.

3. A locking device, comprising a manually controlled locking device connected with the part to be held against turning, a second manually controlled locking device for locking and unlocking the said first-named locking device, and a manually controlled blocking device for blocking and releasing the said second locking device, the said second locking device and the said blocking device having fingerpieces and a keyboard on which the said fingerpieces are mounted.

4. A locking device, comprising a manually controlled locking device connected with the part to be held against turning, a second manually controlled locking device for locking and unlocking the said first-named locking device, and a manually controlled blocking device for blocking and releasing the said second locking device, the said second locking device and the said blocking device having fingerpieces and a keyboard on which the said fingerpieces are arranged in irregular order.

5. A locking device, comprising a ratchet wheel secured to the part to be locked, a locking shaft carrying a dog engaging the said ratchet wheel, a hand-operated mechanism for turning the said locking shaft to swing the dog in or out of engagement with the said ratchet wheel, and a manually controlled locking device adapted to be connected with the said locking shaft to lock the latter against turning by the said hand-operated means.

6. A locking device, comprising a ratchet wheel secured to the part to be locked, a locking shaft carrying a dog engaging the said ratchet wheel, a hand-operated mechanism for turning the said locking shaft to swing the dog in or out of engagement with the said ratchet wheel, trigger levers adapted to engage the said locking shaft to hold the latter against turning, movable blocking members mounted to turn and adapted to block and release the said trigger levers, and a keyboard having fingerpieces connected with the said trigger levers and the said blocking members to move the said blocking members into or out of blocking position and to actuate the said trigger levers when the latter are released by the blocking members.

7. A locking device of the character described, comprising a toothed wheel on the part to be locked, a dog adapted to engage the said ratchet wheel, a shaft carrying the said dog and provided with a shoulder, manually controlled means connected with the shaft to turn the latter to swing the dog into and out of engagement with the ratchet wheel, a spring-pressed locking lever provided with a hook at one end adapted to engage the said shaft shoulder, a rod connected with the said locking lever and provided with a fingerpiece, a blocking eccentric adapted to engage the said locking lever to lock the latter against movement when in locking engagement with the said shaft shoulder, and two rods connected with the said eccentric on opposite sides of its center to turn the eccentric into locking or releasing position relative to the locking lever.

GEORGE FRANCIS BRASSLER.

Copies of this patent may be obtained for five cents each, by addressing the "Commissioner of Patents, Washington, D. C."